(12) United States Patent
Compton et al.

(10) Patent No.: US 12,476,314 B2
(45) Date of Patent: Nov. 18, 2025

(54) STRUCTURAL BATTERY PACK

(71) Applicant: GM GLOBAL TECHNOLOGY OPERATIONS LLC, Detroit, MI (US)

(72) Inventors: Nicholas Compton, Troy, MI (US); Giles D. Bryer, Northville, MI (US); Ian A. Stines, Ann Arbor, MI (US); Jason Mitchick, Royal Oak, MI (US); Alexander M. Bilinski, Avoca, MI (US); Gustavo Cibrian Salazar, Belle River (CA); Jacqueline Nava, Madison Heights, MI (US); Andrew P. Oury, Troy, MI (US); James D. Hendrickson, Oxford, MI (US); Phillip D. Hamelin, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 921 days.

(21) Appl. No.: 17/673,899

(22) Filed: Feb. 17, 2022

(65) Prior Publication Data

US 2023/0261300 A1    Aug. 17, 2023

(51) Int. Cl.
*H01M 50/213* (2021.01)
*H01M 10/613* (2014.01)
*H01M 10/625* (2014.01)
*H01M 50/342* (2021.01)

(52) U.S. Cl.
CPC ....... *H01M 50/213* (2021.01); *H01M 10/613* (2015.04); *H01M 10/625* (2015.04); *H01M 50/3425* (2021.01); *H01M 2220/20* (2013.01)

(58) Field of Classification Search
CPC ............ H01M 50/213; H01M 10/613; H01M 10/625; H01M 50/3425; H01M 2220/20
See application file for complete search history.

(56) References Cited

U.S. PATENT DOCUMENTS

| | | | |
|---|---|---|---|
| 2011/0135975 A1* | 6/2011 | Fuhr ................... | H01M 50/249 429/88 |
| 2013/0089990 A1* | 4/2013 | Ferber, Jr. ............. | H01R 12/00 439/55 |
| 2016/0020446 A1* | 1/2016 | Zheng ................. | H01M 50/503 429/82 |
| 2018/0190960 A1* | 7/2018 | Harris .................. | H01M 50/20 |
| 2018/0272853 A1* | 9/2018 | Wang .................. | H01M 50/204 |
| 2021/0159567 A1* | 5/2021 | Pires ................... | H01M 50/242 |

\* cited by examiner

*Primary Examiner* — Matthew T Martin
*Assistant Examiner* — Taylor Harrison Krone
(74) *Attorney, Agent, or Firm* — Quinn IP Law

(57) ABSTRACT

A structural battery pack includes a bottom cover, a bottom cell carrier, multiple battery cells, a cooling ribbon, a top cell carrier, and a top cover. The bottom cover has a rectangular shape that defines a longitudinal direction and a lateral direction. The bottom cell carrier is coupled to the bottom cover, and defines multiple bottom holders. The bottom holders are arranged in a hexagon pattern that defines multiple rows in the longitudinal direction and multiple columns in the lateral direction. The top cell carrier is coupled to the top cover, defines multiple top holders, and includes an interconnect board that interconnects the battery cells. The top holders are arranged in the hexagon pattern. The battery cells are installed in the bottom cell carrier and the top cell carrier. Each battery cell has a cylindrical shape. The cooling ribbon is installed between the battery cells along the rows.

9 Claims, 7 Drawing Sheets

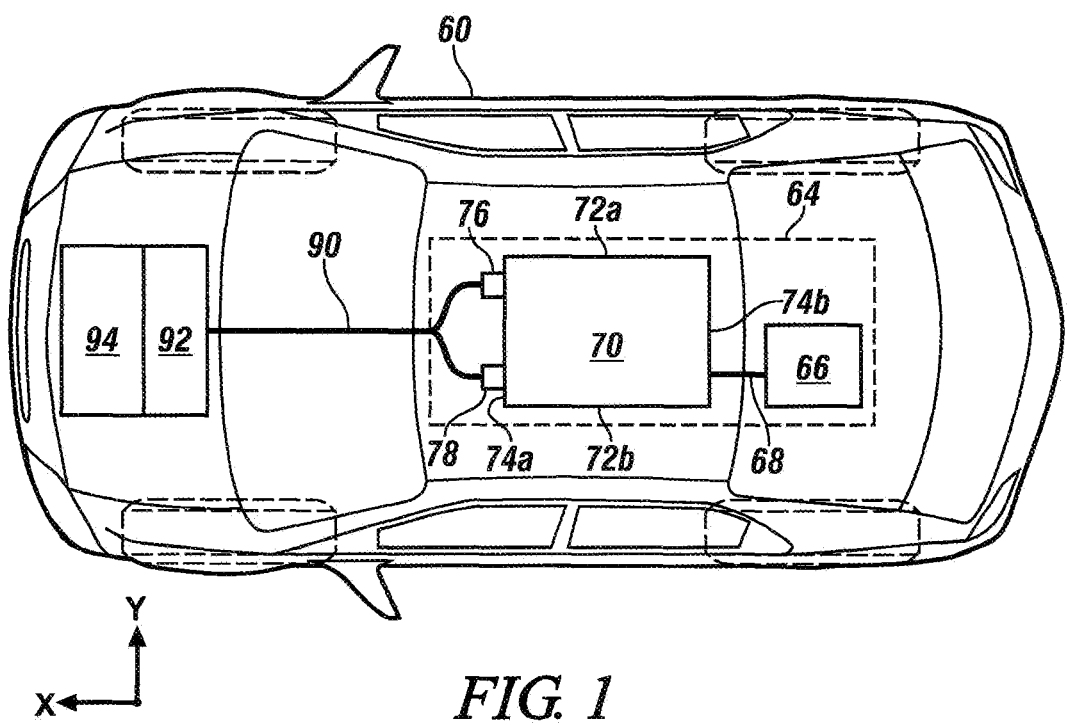
FIG. 1
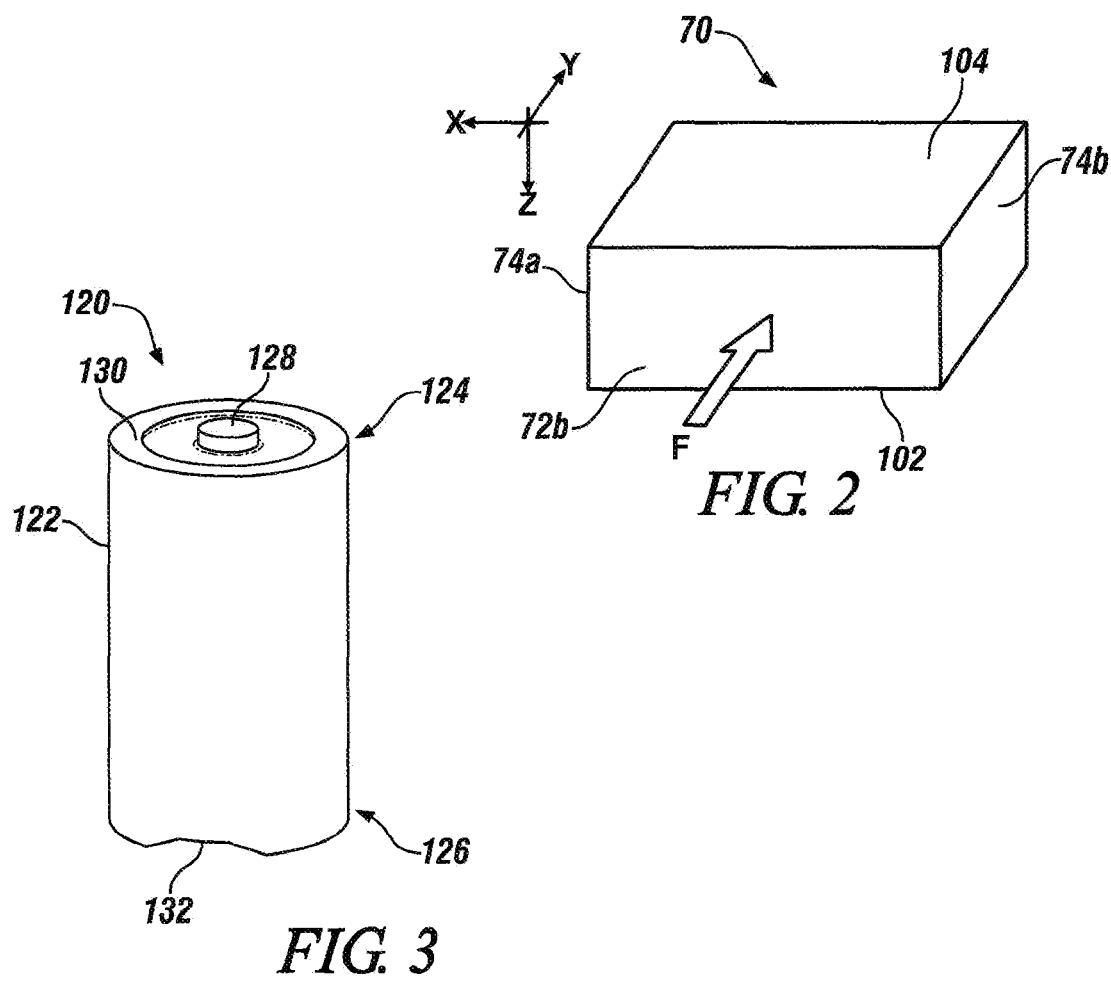
FIG. 2
FIG. 3

STRUCTURAL BATTERY PACK

INTRODUCTION

The present disclosure relates to an apparatus and a method for fabricating a structural battery pack.

Battery packs used in electric vehicles include multiple battery modules installed within a protective pack housing. Each battery module includes multiple battery cells installed within a protective module housing. The pack housing and the module housings are designed to protect the battery cells from damage. As such, a considerable amount of space and weight is consumed by the pack housing and the module housings to establish a specified level of protection.

Accordingly, those skilled in the art continue with research and development efforts in the field of battery packs to reduce the weight while maintaining the protection of the battery cells.

SUMMARY

A structural battery pack is disclosed herein. The structural battery pack includes a bottom cover, a bottom cell carrier, a plurality of bottom holders, a plurality of battery cells, a cooling ribbon, a top cell carrier, a top cover, and an outer frame. The bottom cover has a rectangular shape that defines a longitudinal direction and a lateral direction. The bottom cell carrier is coupled to the bottom cover, and defines a plurality of bottom holders. The plurality of bottom holders is arranged in a hexagon pattern. The hexagon pattern defines a plurality of rows in the longitudinal direction, and a plurality of columns in the lateral direction.

The plurality of battery cells is installed in the bottom cell carrier. Each of the plurality of battery cells has a cylindrical shape with a casing, a first end, and a second end opposite the first end. The first end has a positive electrical terminal and a negative electrical terminal. The second end has a vent plate. The second ends are located within the plurality of bottom holders. The cooling ribbon is installed between the plurality of battery cells along the plurality of rows.

The top cell carrier is coupled to the plurality of battery cells. The top cell carrier defines a plurality of top holders, and includes an interconnect board. The plurality of top holders is arranged in the hexagon pattern. The first ends of the plurality of battery cells are located within the plurality of top holders. The interconnect board includes a busbar assembly having a plurality of first conductive lines arranged in the longitudinal direction, and a plurality of second conductive lines arranged in the lateral direction. The plurality of first conductive lines electrically connects in series the plurality of battery cells in each of the plurality of rows. Each of the plurality of second conductive lines electrically connects two or more of the plurality of first conductive lines.

The top cover is coupled to the top cell carrier. The outer frame is coupled to the bottom cover and the top cover, and surrounding the plurality of battery cells. The outer frame, the bottom cover, the bottom cell carrier, the top cell carrier, and the top cover direct a physical force applied to the structural battery pack around the plurality of battery cells.

In one or more embodiments of the structural battery pack, the plurality of bottom holders is formed with a body and a plurality of standoffs. The body defines the plurality of bottom holders. The plurality of standoffs forms an air gap between the body and the bottom cover. The air gap is in fluid communication with the vent plate of each of the plurality of battery cells to receive a gas escaping from one or more of the plurality of battery cells.

In one or more embodiments of the structural battery pack, the body is formed with a plurality of shelves offset from the bottom cover.

In one or more embodiments, the structural battery pack includes a plurality of rupture disks installed on the plurality of shelves. Each of the plurality of rupture disks is configured to dislodge from a corresponding one of the plurality of shelves in response to an overpressure event caused by a rupture in a corresponding one of the plurality of battery cells.

In one or more embodiments of the structural battery pack, the plurality of second conductive lines connects adjacent rows of the battery cells in parallel to define a plurality of battery cell sets. Each of the plurality of battery cell sets has a plurality of nodes connected in series by the plurality of first conductive lines.

In one or more embodiments of the structural battery pack, the interconnect board includes a plurality of conductive senselines electrically connected to the plurality of nodes within the plurality of battery cell sets.

In one or more embodiments of the structural battery pack, the plurality of bottom holders and the plurality of top holders locate the casings of the plurality of battery cells apart from each other in the longitudinal direction to establish a plurality of isolation gaps between neighboring ones of the plurality of battery cells, and in the lateral direction to provide space for the cooling ribbon.

In one or more embodiments, the structural battery pack includes a potting material inserted into the plurality of isolation gaps.

In one or more embodiments of the structural battery pack, the structural battery pack is characterized by a lack of a plurality of battery modules.

A method of fabricating a structural battery pack is provided herein. The method includes coupling an outer frame to a bottom cover and coupling the bottom cover to a bottom cell carrier. The bottom cover has a rectangular shape that defines a longitudinal direction and a lateral direction. The bottom cell carrier defines a plurality of bottom holders. The plurality of bottom holders is arranged in a hexagon pattern. The hexagon pattern defines a plurality of rows in the longitudinal direction, and a plurality of columns in the lateral direction.

The method includes installing a plurality of battery cells in the bottom cell carrier. Each of the plurality of battery cells has a cylindrical shape with a casing, a first end, and a second end opposite the first end. The first end has a positive electrical terminal and a negative electrical terminal. The second end has a vent plate. The second ends are located within the plurality of bottom holders.

The method further includes installing a cooling ribbon between the plurality of battery cells along the plurality of rows, and coupling a top cell carrier to the plurality of battery cells. The top cell carrier defines a plurality of top holders, and includes an interconnect board. The plurality of top holders is arranged in the hexagon pattern. The first ends of the plurality of battery cells are located within the plurality of top holders. The interconnect board includes a busbar assembly having a plurality of first conductive lines arranged in the longitudinal direction, and a plurality of second conductive lines arranged in the lateral direction. The plurality of first conductive lines electrically connects in series the plurality of battery cells in each of the plurality of rows. Each of the plurality of second conductive lines electrically connects two or more of the plurality of first conductive lines.

The method includes coupling a top cover to the top cell carrier and coupling the outer frame to the top cover. The outer frame surrounds the plurality of battery cells. The method includes verifying that the outer frame, the bottom cover, the bottom cell carrier, the top cell carrier, and the top cover direct a physical force applied to the structural battery pack around the plurality of battery cells.

In one or more embodiments, the method includes forming the plurality of bottom holders with a body and a plurality of standoffs. The body defines the plurality of bottom holders. The plurality of standoffs forms an air gap between the body and the bottom cover. The air gap is in fluid communication with the vent plate of each of the plurality of battery cells to receive a gas escaping from one or more of the plurality of battery cells.

In one or more embodiments, the method includes forming the body with a plurality of shelves offset from the bottom cover.

In one or more embodiments, the method includes installing a plurality of rupture disks on the plurality of shelves. Each of the plurality of rupture disks is configured to dislodge from a corresponding one of the plurality of shelves in response to an overpressure event caused by a rupture in a corresponding one of the plurality of battery cells.

In one or more embodiments, the method includes connecting adjacent rows of the battery cells in parallel with the plurality of second conductive lines to define a plurality of battery cell sets. Each of the plurality of battery cell sets has a plurality of nodes connected in series by the plurality of first conductive lines.

In one or more embodiments of the method, the interconnect board includes a plurality of conductive senselines electrically connected to the plurality of nodes within the plurality of battery cell sets.

In one or more embodiments of the method, the plurality of bottom holders and the plurality of top holders locate the casings of the plurality of battery cells apart from each other in the longitudinal direction to establish a plurality of isolation gaps between neighboring ones of the plurality of battery cells, and in the lateral direction to provide space for the cooling ribbon.

In one or more embodiments, the method includes inserted a potting material into the plurality of isolation gaps.

In one or more embodiments of the method, the structural battery pack is characterized by a lack of a plurality of battery modules.

In one or more embodiments, the method includes coupling the outer frame to a skid plate.

A structural battery pack formed by a method is provided herein. The method includes coupling an outer frame to a bottom cover and coupling the bottom cover to a bottom cell carrier. The bottom cover has a rectangular shape that defines a longitudinal direction and a lateral direction. The bottom cell carrier defines a plurality of bottom holders. The plurality of bottom holders is arranged in a hexagon pattern. The hexagon pattern defines a plurality of rows in the longitudinal direction, and a plurality of columns in the lateral direction.

The method includes installing a plurality of battery cells in the bottom cell carrier. Each of the plurality of battery cells has a cylindrical shape with a casing, a first end, and a second end opposite the first end. The first end has a positive electrical terminal and a negative electrical terminal. The second end has a vent plate. The second ends are located within the plurality of bottom holders.

The method further includes installing a cooling ribbon between the plurality of battery cells along the plurality of rows, and coupling a top cell carrier to the plurality of battery cells. The top cell carrier defines a plurality of top holders, and includes an interconnect board. The plurality of top holders is arranged in the hexagon pattern. The first ends of the plurality of battery cells are located within the plurality of top holders. The interconnect board includes a busbar assembly having a plurality of first conductive lines arranged in the longitudinal direction, and a plurality of second conductive lines arranged in the lateral direction. The plurality of first conductive lines electrically connects in series the plurality of battery cells in each of the plurality of rows. Each of the plurality of second conductive lines electrically connects two or more of the plurality of first conductive lines.

The method includes coupling a top cover to the top cell carrier and coupling the outer frame to the top cover. The outer frame surrounds the plurality of battery cells. The method includes verifying that the outer frame, the bottom cover, the bottom cell carrier, the top cell carrier, and the top cover direct a physical force applied to the structural battery pack around the plurality of battery cells.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic plan diagram illustrating a context of a system.

FIG. 2 is a schematic perspective diagram of a structural battery pack in accordance with one or more exemplary embodiments.

FIG. 3 is a schematic perspective diagram of a battery cell in accordance with one or more exemplary embodiments.

DETAILED DESCRIPTION

Figure 4:
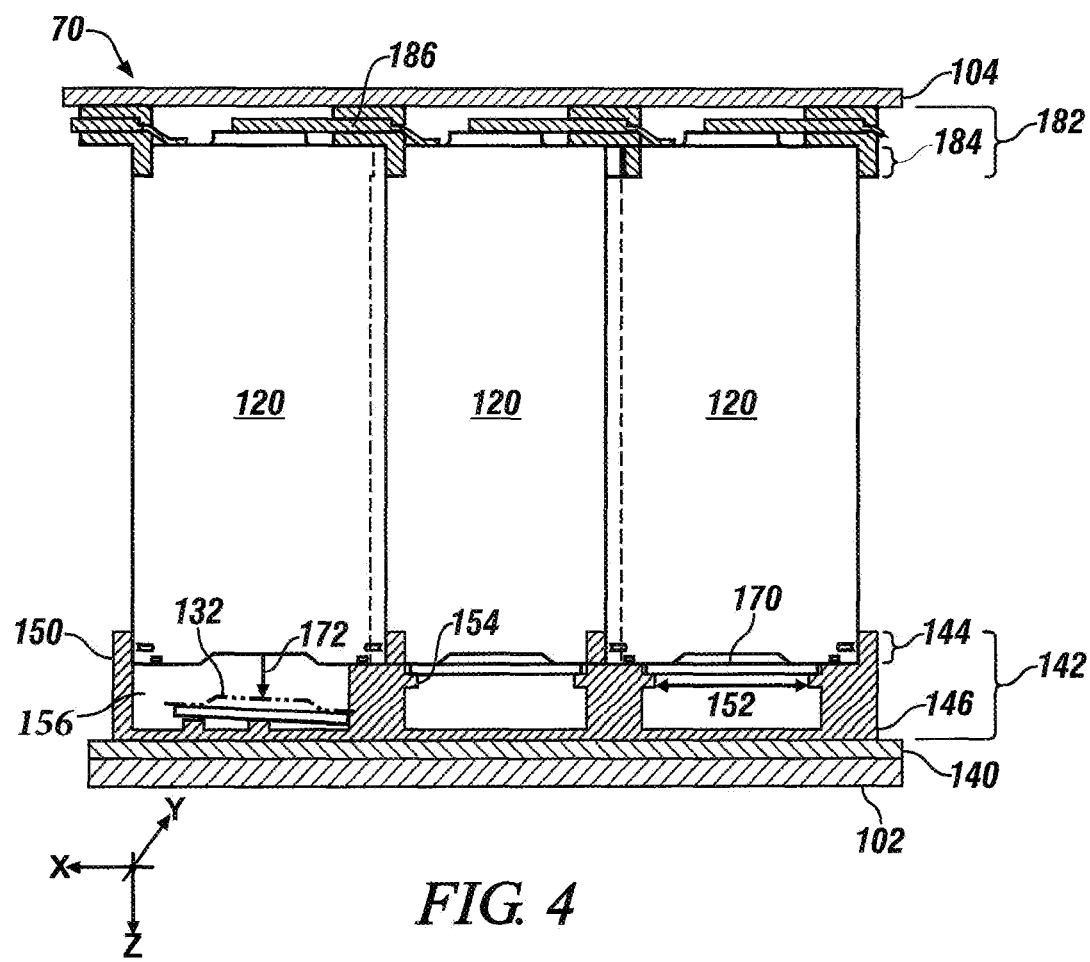
FIG. 4 is a schematic cross-sectional diagram of a portion of the structural battery pack in accordance with one or more exemplary embodiments.

Embodiments of the disclosure utilize cylindrical battery cells within a battery pack for both electrical capacity and structural support. The mechanical properties of the cylindrical battery cells, and tying the battery cells to structural members of the battery pack results in a stable structure. An integrated interconnect board is formed as a structural member of a top cell carrier. The top cell carrier physically joins both the battery cells and a top cover of the battery pack. A bottom cell carrier is also a structural member and joins the battery cells to a bottom of the battery pack. A housing around the battery cells may be metal for durability. The top cell carrier and the bottom cell carrier may be plastic to accommodate thermal expansions and contractions.

Referring to FIG. 1, a schematic plan diagram illustrating a context of a system is shown. The system may implement a vehicle 60. The vehicle 60 generally comprises a distributed battery power system 64, a harness 90, a power-pack controller 92 and one or more motors 94 (one motor 94 is shown for clarity). The distributed battery power system 64 may include a battery controller 66, a communication bus 68 and a structural battery pack 70. The structural battery pack 70 may include opposing pack sides 72a-72b, opposing pack ends 74a-74b, a positive battery pack terminal 76 and a negative battery pack terminal 78. For the purposes of explanation, a front of the vehicle 60 may be aligned in a positive X (or longitudinal) direction. A right side of the vehicle 60 (as seen looking down at a top of the vehicle 60) may be aligned in a positive Y direction.

The vehicle 60 may include, but is not limited to, mobile objects such as automobiles, trucks, motorcycles, boats, trains and/or aircraft. In some embodiments, the vehicle 60 may include stationary objects such as billboards, kiosks, power back-up systems (e.g., uninterruptible power supplies) and/or marquees. Other types of vehicles 60 may be implemented to meet the design criteria of a particular application.

The distributed battery power system 64 is generally operational to store energy used by the power-pack controller 92 and the motor 94. In a charging mode, the distributed battery power system 64 may receive electrical current from the power-pack controller 92 (where the motor 94 includes a gas-powered capability) or from a charging station. In a discharging mode, the distributed battery power system 64 may provide electrical current to the power-pack controller 92 to operate the motor 94 (where the motor 94 includes an electric-powered capability).

The battery controller 66 may be implemented as a vehicle interface control module (VICM). The battery controller 66 is generally operational to control one or more profiles and/or modes of the structural battery pack 70. The profiles may include a pack charging profile, a fast charging profile and/or a pack discharging profile. The profiles generally establish maximum current rates, maximum voltages, minimum voltages and maximum temperatures for the structural battery pack 70. The profiles may monitor the state of charge, and perform cell balancing. The profiles may be temperature dependent, mileage (e.g., odometer-measured distances) dependent and/or operational life (e.g., time) dependent.

The communication bus 68 may implement a bidirectional bus. The communication bus 68 is generally operational to transfer data between the battery controller 66 and the structural battery pack 70. The data may include but is not limited to status requests and measured cell voltages. Other types of data may be implemented to meet the design criteria of a particular application.

The structural battery pack 70 may be a high-voltage battery pack configured to store electrical energy. The structural battery pack 70 is generally operational to receive electrical power from the power-pack controller 92 and provide electrical power to the power-pack controller 92. The structural battery pack 70 may include multiple battery cells electrically connected in series and/or in parallel between the positive battery pack terminal 76 and the negative battery pack terminal 78. In various embodiments, the structural battery pack 70 may provide approximately 200 to 1,000 volts DC (direct current) electrical potential between the positive battery pack terminal 76 and the negative battery pack terminal 78. Other battery voltages may be implemented to meet the design criteria of a particular application. The positive battery pack terminal 76 and the negative battery pack terminal 78 may be physically and electrically connected to the harness 90. In various embodiments, structural battery pack 70 is characterized by the absence of battery modules.

The harness 90 may be an electrical harness. The harness 90 is generally operational to carry electrical power between the power-pack controller 92 and the structural battery pack 70. In the charging mode, the harness 90 may transfer the electrical power from the power-pack controller 92 to the structural battery pack 70. In the discharging mode, the electrical power may flow along the harness 90 from the structural battery pack 70 to the power-pack controller 92.

The power-pack controller 92 may be implemented as a controller that exchanges electrical power between the structural battery pack 70 and the motor 94. The power-pack controller 92 is generally operational to transfer electrical power from an alternator to the structural battery pack 70 in the charging mode to charge the structural battery pack 70 where the motor 94 includes an internal-combustion engine. The power-pack controller 92 may draw electrical power from the structural battery pack 70 in the discharge mode. The electrical power received from the structural battery pack 70 may be used to power the motor 94 and/or other loads within the vehicle 60.

The motor 94 (or individual ones of multiple motors 94) may be an electric motor or a hybrid gas/electric motor. The motor 94 is generally operational to provide rotation and torque to drive wheels of the vehicle 60 to propel the vehicle 60 about the ground and/or roads. The electrical power consumed by the motor 94 may be provided by the structural battery pack 70 and/or the alternator of the vehicle 60 under the control of the power-pack controller 92.

Referring to FIG. 2, a schematic perspective diagram of an example implementation of the structural battery pack 70 is shown in accordance with one or more exemplary embodiments. The structural battery pack 70 generally has a cubic shape established by the pack sides 72a-72b, the pack ends 74a-74b, a skid plate 102, and a top cover 104.

When installed in the vehicle 60, the pack sides 72a-72b are aligned in the longitudinal direction X. The pack ends 74a-74b are aligned in the lateral direction Y. The skid plate 102 forms a bottom surface of the structural battery pack 70. The top cover 104 forms a top surface of the structural battery pack 70.

A physical force F may be applied to the structural battery pack 70 from multiple possible directions during an energy management event involving the vehicle 60. The physical force F is commonly applied to the pack sides 72a-72b, as illustrated. In various events, the physical force F may be applied to the pack ends 74a-74b. In other events, the physical force F may be applied along a vertical Z direction to either the skid plate 102 or the top cover 104.

Referring to FIG. 3, a schematic perspective diagram of an example implementation of a battery cell 120 is shown in accordance with one or more exemplary embodiments. The battery cell 120 is operational to store energy. The battery cell 120 may be implemented as a lithium-ion battery cell. Battery cell types may include, but are not limited to standard 18650, 21700, 26650. 32650 and 4680 types. Other battery cell types and/or battery cell chemistries may be implemented to meet the design criteria of a particular application.

The battery cell 120 may have a casing 122 with a cylindrical shape, a first end 124 at one end of the casing 122, and a second end 126 at an opposite end of the casing 122 as the first end 124. A positive electrical terminal 128 is located at the first end 124 of the battery cell 120. The casing 122 may form a negative electrical terminal 130. The negative electrical terminal 130 is accessible at the first end 124 of the battery cell 120. In some embodiments, the negative electrical terminal 130 may be accessible at the second end and/or along the side of the battery cell 120. A vent plate 132 is formed at the second end of the battery cell 120. The vent plate 132 generally protects the battery cell 120 from an unpredictable failure caused by an increasing internal pressure within a battery cell 120. In order to control the failure of the battery cell 120, the vent plate 132 ruptures when an internal pressure of the battery cell 120 reaches a predetermined overpressure value. In various embodiments, the battery cell 120 may be implemented as a prismatic battery cell. In other embodiments, the battery cell 120 may be implemented as a pouch battery cell.

Referring to FIG. 4, a schematic cross-sectional diagram of a portion of the structural battery pack 70 is shown in accordance with one or more exemplary embodiments. The structural battery pack 70 generally includes the skid plate 102, a bottom cover 140, a bottom cell carrier 142, multiple rupture disks 170, multiple battery cells 120, a top cell carrier 182, and the top cover 104. The bottom cell carrier 142 includes a body 144, multiple standoffs 146, multiple bottom holders 150 with multiple apertures 152, and multiple shelves 154. The shelves 154 engage the second ends 126 of the battery cells 120. The standoffs 146 form an air gap 156 between the body 144 and the bottom cover 140. The air gap 156 is in fluid communication with the rupture disks 170 and enables a gas 172 escaping from one or more of the battery cells 120 sufficient space to be directed away from the battery cells 120. The air gap 156 may also provide a channel from radio-frequency (RF) signals to propagate within the structural battery pack 70 for wireless cell monitoring. The top cell carrier 182 includes multiple top holders 184 and an interconnect board 186.

The skid plate 102 may be implemented as a metal plate. The skid plate 102 is operational to provide structural support and protection at the bottom (as oriented in the vehicle 60) of the structural battery pack 70. In some embodiments, the skid plate 102 may be fabricated from steel or similar hard alloy.

The bottom cover 140 may be implemented as a metal shear plate. In various embodiments, the bottom cover 140 may be an aluminum extrusion. The bottom cover 140 generally has a thickness of approximately 6 millimeters (mm) to approximately 10 mm (e.g., 8 mm).

The bottom cell carrier 142 may be implemented as a plastic carrier. The bottom cell carrier 142 is configured to provide alignment of the battery cells 120 in a predetermined hexagon type pattern. The bottom cell carrier 142 is shaped to form the body 144 and the standoffs 146. The body 144 is shaped to form multiple bottom holders 150, a respective bottom holder 150 for each battery cell 120. The bottom holders 150 are configured to hold the second ends 126 of the battery cells 120 securely and apart from each other. The body 144 is also shaped to include multiple apertures 152 aligned to the vent plates 132 of the battery cells 120. The apertures 152 allow the gas 172 from the battery cells 120 to enter the air gap 156. Each aperture 152 is surrounded by a shelf 154. The standoffs 146 form the air gap 156. The air gap 156 may range from approximately 5 mm to approximately 9 mm (e.g., 7 mm) tall.

The rupture disks 170 may be implemented as electrically insulating disks. In various embodiments, the rupture disks 170 are fabricated from mica. The rupture disks 170 are installed on the shelves 154. The rupture disks 170 are operational to protect the second ends 126 of the battery cells 120 during normal operation. In the event of a failure of a particular battery cell 120 (e.g., the left battery cell 120 in the figure) that causes an overpressure event, a corresponding rupture disk 170 may be dislodged from the corresponding shelf 154, or break into pieces, thereby allowing the gas 172 and/or any material exiting the damaged battery cell 120 to flow into the air gap 156. The rupture disk 170 may also be operational to provide thermal protection during a vent of an adjacent battery cell 120. In various embodiments, the rupture disks 170 may be implemented with a potting material and/or other insulating material disposed at the second end 126 of the battery cells 120.

The top cell carrier 182 may be implemented as a plastic carrier. The top cell carrier 182 is configured to provide alignment of the battery cells 120 in the same predetermined hexagon type pattern as the bottom cell carrier 142. The top cell carrier 182 is shaped to form multiple top holders 184, a respective top holder 184 for each battery cell 120. The top holders 184 are configured to hold the first ends 124 of the battery cells 120 securely and apart from each other. The top cell carrier 182 may range from approximately 10 mm to approximately 14 mm (e.g., 12 mm) tall.

The top cover 104 may be implemented as another metal shear plate. In various embodiments, the top cover 104 may be an aluminum extrusion. The bottom cover 140 generally has a thickness of approximately 2 mm to approximately 6 mm (e.g., 4 mm).

Figure 5:
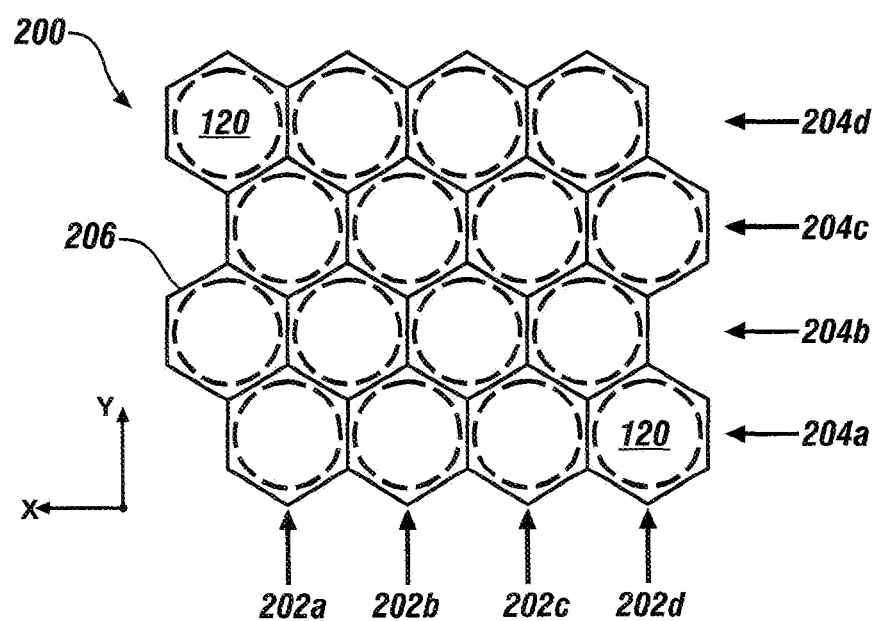
FIG. 5 is a schematic plan diagram of a hexagon pattern in accordance with one or more exemplary embodiments.

Referring to FIG. 5, a schematic plan diagram of an example portion of a hexagon pattern 200 is shown in accordance with one or more exemplary embodiments. The hexagon pattern 200 generally defines multiple rows 202a-202d and multiple columns 204a-204d of hexagons 206. In various embodiments, the rows 202a-202d may be aligned parallel to the longitudinal direction X (as shown). In other embodiments, the rows 202a-202d may be aligned parallel to the lateral direction Y.

The hexagons 206 are arranged in a straight line along each row 202a-202d. The hexagons 206 are arranged in a back-and-forth oscillating fashion along each column 204a-204d. The hexagon pattern 200 provides for a dense packaging of the battery cells 120 within the structural battery pack 70. In various embodiments, the pattern 200 may be a 2 by 4 rectangular pattern or a 2 by 5 rectangular pattern.

Figure 6:
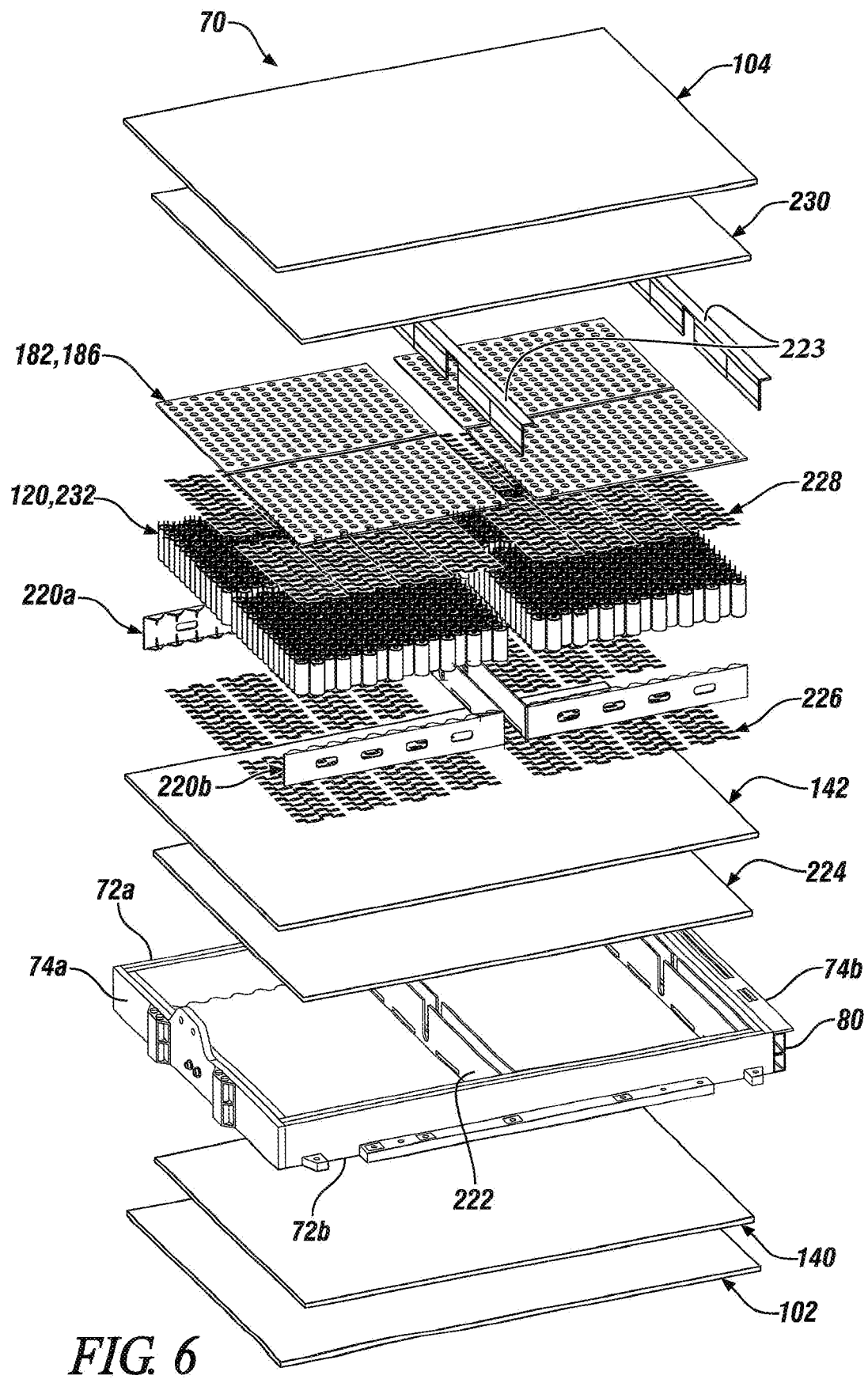
FIG. 6 is a schematic partially exploded perspective diagram of the structural battery pack in accordance with one or more exemplary embodiments.

Referring to FIG. 6, a schematic partially exploded perspective diagram of an example implementation of the structural battery pack 70 is shown in accordance with one or more exemplary embodiments. A combination of the pack sides 72a-72b and the pack ends 74a-74b generally defines an outer frame 80. The outer frame 80 surrounds and protects the battery cells 120 from the physical force F where applied horizontally to the structural battery pack 70. Additional structural support may be provided inside the outer frame 80 by installing side supports 220a-220b and one or more crossbeams 222 four shown). The structural battery pack 70 includes one or more cell monitoring unit boards 223 and a battery radio frequency module (not shown).

The side support 220a-220b may be implemented as metal supports. The side supports 220a-220b reside between the outer frame 80 and the battery cells 120.

The crossbeams 222 may be implemented as metal beams. A crossbeam 222 may reside between two groups of the battery cells 120, as illustrated. Optional crossbeams 222 may be located adjoining the pack ends 74a-74b.

Each cell monitoring unit board 223 may be implemented as a voltage and temperature monitoring circuit. Battery cell voltages and various temperatures are reported to the battery radio frequency module via a wireless communication protocol. Signal air volume for the wireless communication may be provide by the air gap 156 under the battery cells 120 (see FIG. 4). The battery radio frequency module communicates with the battery controller 66 through the communication bus 68 on a periodic basis. The cell monitoring unit boards 223 receives commands from the battery controller 66 to perform internal circuit diagnostics and cell balancing. The cell monitoring unit boards 223 return the voltage data and the temperature data to the battery controller 66.

A first adhesive layer 224 is applied between the bottom cell carrier 142 and the bottom cover 140. The first adhesive layer 224 bonds together the bottom cell carrier 142 and the bottom cover 140. The first adhesive layer 224 may have a thickness of approximately 0.5 mm to approximately 2 mm.

A second adhesive layer 226 is applied between the bottom cell carrier 142 and the battery cells 120. The second adhesive layer 226 bonds the battery cells 120 to the bottom cell carrier 142.

A third adhesive layer 228 is applied between the battery cells 120 and the top cell carrier 182. The third adhesive layer 228 bonds the battery cells 120 to the top cell carrier 182.

A fourth adhesive layer 230 is applied between the top cell carrier 182 and the top cover 104. The fourth adhesive layer 230 bonds the top cover 104 to the top cell carrier 182. The fourth adhesive layer 230 may have a thickness of approximately 0.25 mm to approximately 2 mm.

Figure 7:
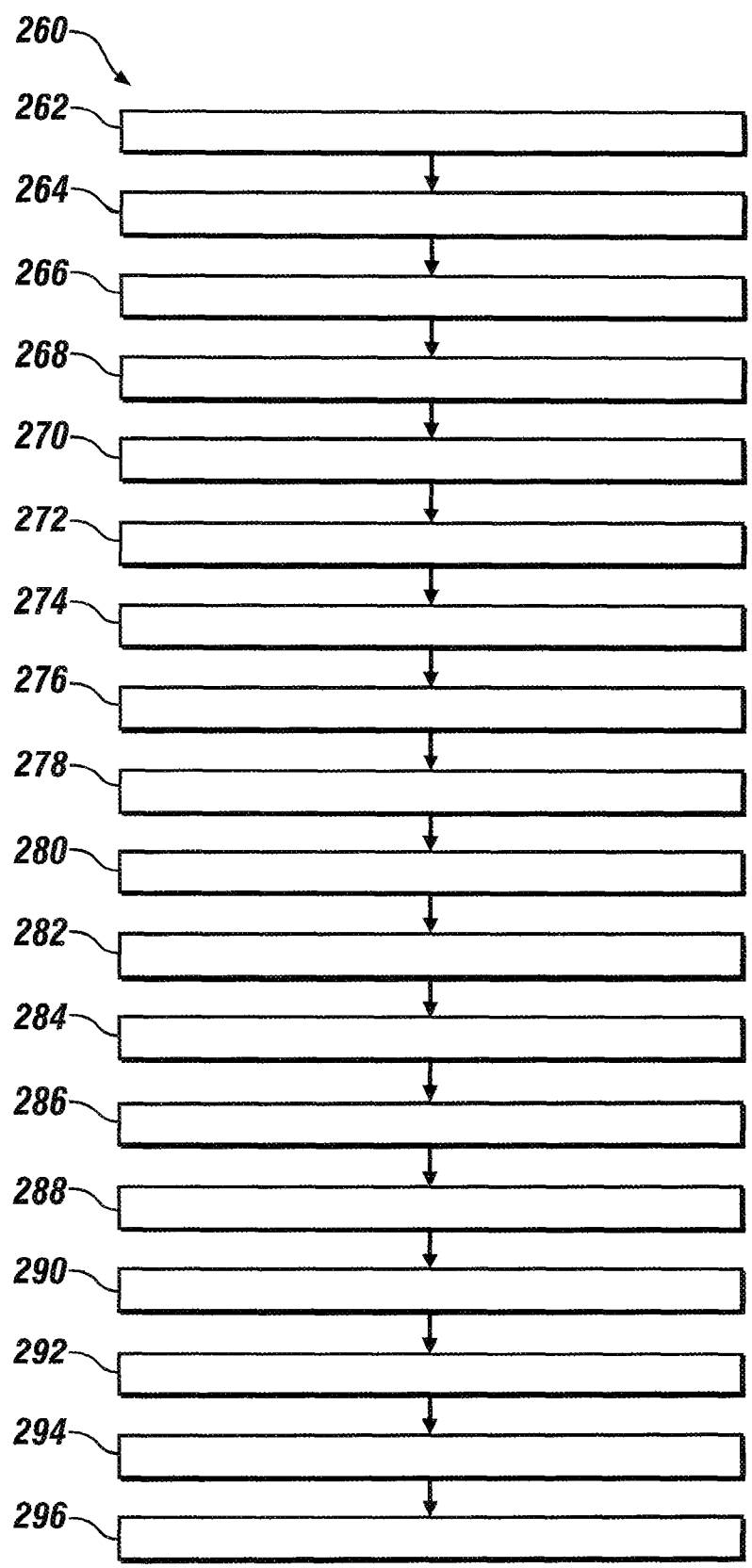
FIG. 7 is a flow diagram of a method for fabricating the structural battery pack in accordance with one or more exemplary embodiments.

Referring to FIG. 7, a flow diagram of an example method 260 for fabricating the structural battery pack 70 is shown in accordance with one or more exemplary embodiments. The method (or process) 260 generally includes steps 262 to 296, as illustrated. The sequence of steps is shown as a representative example. Other step orders may be implemented to meet the criteria of a particular application. The method 260 may be implemented in a standard battery pack manufacturing facility.

In the step 262, the various components of the structural battery pack 70 may be formed. The outer frame 80 and the skid plate 102 may be coupled in the step 264. The bottom cover 140 is coupled to the outer frame 80 in the step 266. The side supports 220a-220b and crossbeams 222 are coupled to the outer frame 80 in the step 268. The coupling of the step 264 to 268 may be achieved by welding, with bolts, or other suitable fasters.

In the step 270, the first adhesive layer 224 may be applied between the bottom cover 140 and the bottom cell carrier 142. The bottom cover 140 and the bottom cell carrier 142 are coupled in the step 272. The rupture disks 170 are installed in the bottom holders 150 in the step 274.

In the step 276, the second adhesive layer 226 is applied between the bottom cell carrier 142 and the battery cells 120. The battery cells 120 are installed in the step 278 into the bottom holders 150 of the bottom cell carrier 142. The bottom cell carrier 142 and the battery cells 120 are coupled together in the step 280. One or more cooling ribbons 232 may be installed between the battery cells 120 in the step 282. In some embodiments, the cooling ribbons 232 and the battery cells 120 may be installed concurrently. In the step 284, voids between neighboring battery cells 120 and between the end battery cells 120 and the outer frame 80 may be filled with the potting material 330 (see FIG. 8).

The third adhesive layer 228 is applied in the step 286 between the battery cells 120 and the top cell carrier 182. The battery cells 120 are coupled to the top cell carrier 182 in the step 288. The coupling may include an electrical coupling of conductive lines in the interconnect board 186 and the electrical terminals 128 and 130 of the battery cells 120.

In the step 290, the fourth adhesive layer 230 is applied between the top cell carrier 182 and the top cover 104. The top cover 104 and the top cell carrier 182 are coupled in the step 292. The top cover 104 is also coupled to the outer frame 80 in the step 294.

In the step 296, the structural battery pack 70 may be tested to verify compliance with one or more performance criteria. In various embodiments, a test may include verifying that the force F applied to an outer surface of the structural battery pack 70 is directed (or routed) around the battery cells 120 by various combinations of the outer frame 80, the skid plate 102, the top cover 104, the bottom cover 140, the bottom cell carrier 142, the top cell carrier 182, the side supports 220a-220b, and/or the crossbeams 222. Another test may verify the ability of the structural battery pack 70 to receive, hold, and discharge an electric current sufficient to power a motor 94 of a vehicle 60 under various conditions. As such, the structural battery pack 70 provides a cost efficient solution that reduces mass, utilizes the volume efficiently, and incorporates components based on added value to the structure.

Figure 8:
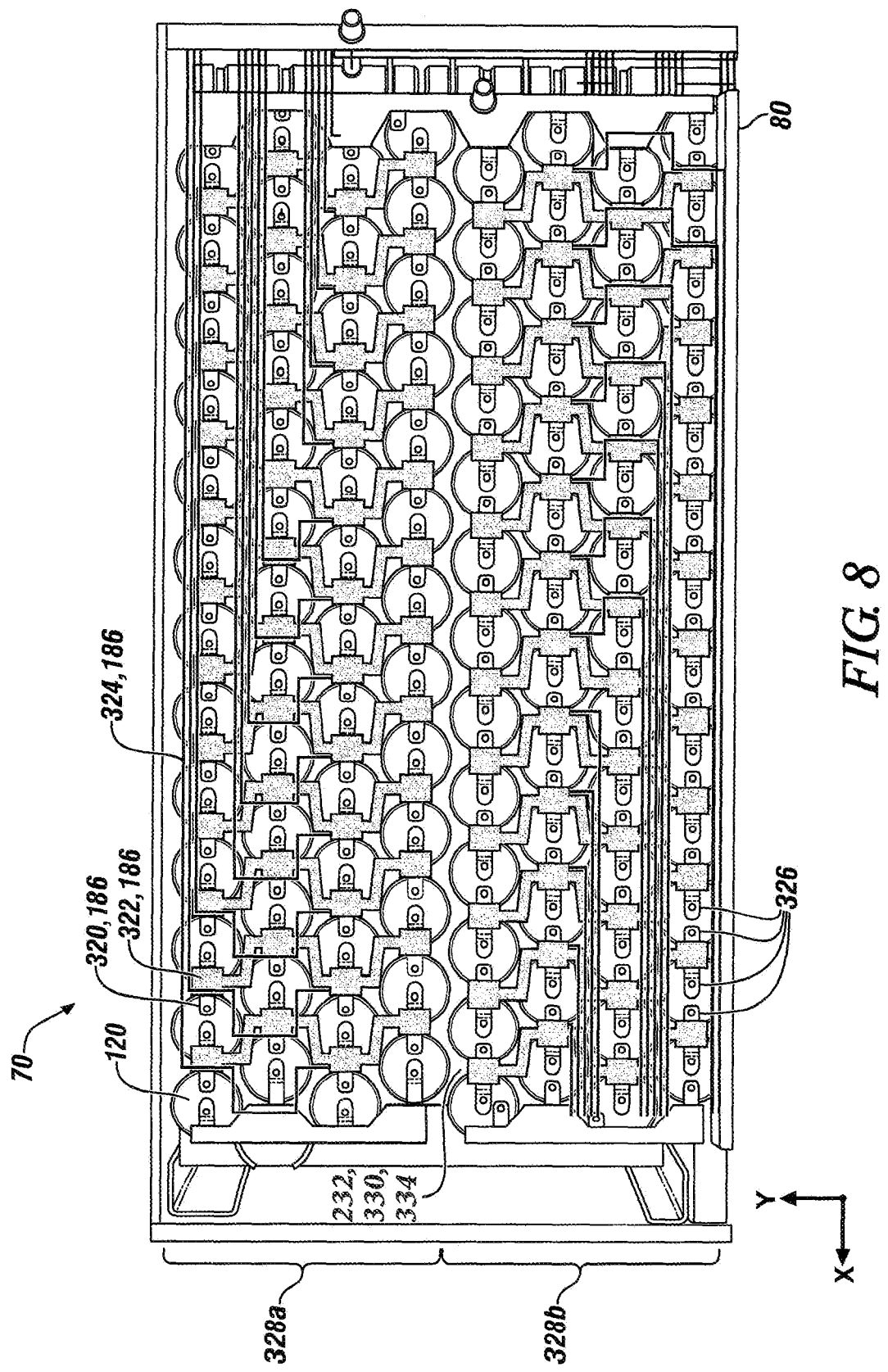
FIG. 8 is a schematic plan diagram of a layout of the structural battery pack in accordance with one or more exemplary embodiments.

Referring to FIG. 8, a schematic plan diagram on an example layout of the structural battery pack 70 is shown in accordance with one or more exemplary embodiments. The battery cells 120 are surrounded by the outer frame 80 and arranged in the hexagon pattern. The first ends 124 of the battery cells 120 are electrically coupled to the interconnect board 186. The interconnect board 186 may include a busbar assembly and a senseline assembly. The busbar assembly may be implemented as a one-piece configuration having a single conductor layer that is directly connected to the battery cells 120, a two-piece configuration, or a combination of both. The two-piece configuration (illustrated) includes a first conductor layer formed as multiple first conductive lines 320 that are directly connected to the battery cells 120, and a second conductor layer formed as multiple second conductive lines 322 connected to the first conductor lines 320 via welds. Various weld strategies, such as laser welding, ultrasonic welding, resistance welding, wire/ribbon bonding, may be employed. In the one-piece configuration, the first conductive lines 320 and the second conductive lines 322 are formed from the single conductive layer. The senseline assembly includes multiple conductive senselines 324. The second conductor lines 322 extend between the first conductor lines 320 and the conductive senselines 324.

The first conductive lines 320 are generally oriented along the rows of the hexagon pattern in the longitudinal direction X. Each first conductive line 320 electrically connects in series neighboring battery cells 120, connecting the positive terminal of one battery cell 120 with the negative terminal of a neighboring battery cell 120. The series connections increase the voltage available between the positive battery pack terminal 76 and the negative battery pack terminal 78 (see FIG. 1). In various embodiments, the first conductive lines 320 may have a line width that provides a fusing capability at excessive currents. Therefore, in response to a short interconnect and/or bad battery cell 120 within the structural battery pack 70 that results in a larger than normal current, one or more of the first conductive lines 320 may vaporize to electrically isolate the short and/or bad battery cell 120.

The second conductive lines 322 are generally oriented along the columns of the hexagon pattern in the lateral direction Y. Each second conductive line 322 electrically connects two or more neighboring rows of the battery cells 120 in parallel. In the example illustrated, each second conductive line 322 connects two or more (e.g., four) rows in parallel. The parallel connections increase the discharge current and the charging current at the positive battery pack terminal 76 and the negative battery pack terminal 78 (see FIG. 1). In various embodiments, the second conductive lines 322 may have a line width that provides a fusing capability at excessive currents. Therefore, in response to a short interconnect and/or bad battery cell 120 within the structural battery pack 70 that results in a larger than normal current, one or more of the second conductive lines 322 may vaporize to electrically isolate the short/bad battery cell 120.

The conductive senselines 324 are generally oriented along the rows of the hexagon pattern in the longitudinal direction X. Each conductive senseline 324 electrically connects to one of the nodes 326 established between inter-connected battery cells 120. For example, a node 326 is established by the first conductive lines 320 where a positive terminal of one battery cell 120 is electrically connected in series with another battery cell 120. The conductive senselines 324 generally provide a mechanism for measuring the voltages across each battery cell 120 to determine a state of charge and/or health of the battery cells 120. The potting material 330 may be inserted into the voids within the structural battery pack 70 (e.g., in the isolation gaps 334 between adjacent battery cells 120) to increase the stiffness of the pack and dampen vibrations. The isolation gaps 334 also maintain electrical isolation between the casings 122 of adjacent battery cells 120. Additional layout embodiments of the structural battery pack 70 may be found in co-pending U.S. patent application Ser. No. 17/665,714, filed Feb. 7, 2022, which is hereby incorporated by reference in its entirety.

The battery cells 120 may be arranged in battery cell sets 328a-328b. The battery cells 120 within each row of a battery cell set 328a-328b may be electrically connected in series. The rows of the battery cells 120 within each battery cell set 328a-328b may be electrically connected in parallel. In various embodiments, the battery cell sets 328a-328b may be electrically connected together in series to operate the structural battery pack 70 at a higher voltage than a single battery cell set 328a-328b. In other embodiments, the battery cell sets 328a-328b may be electrically connected together in parallel to operate the structural battery pack 70 at a higher current than a single battery cell set 328a-328b.

Figure 9:
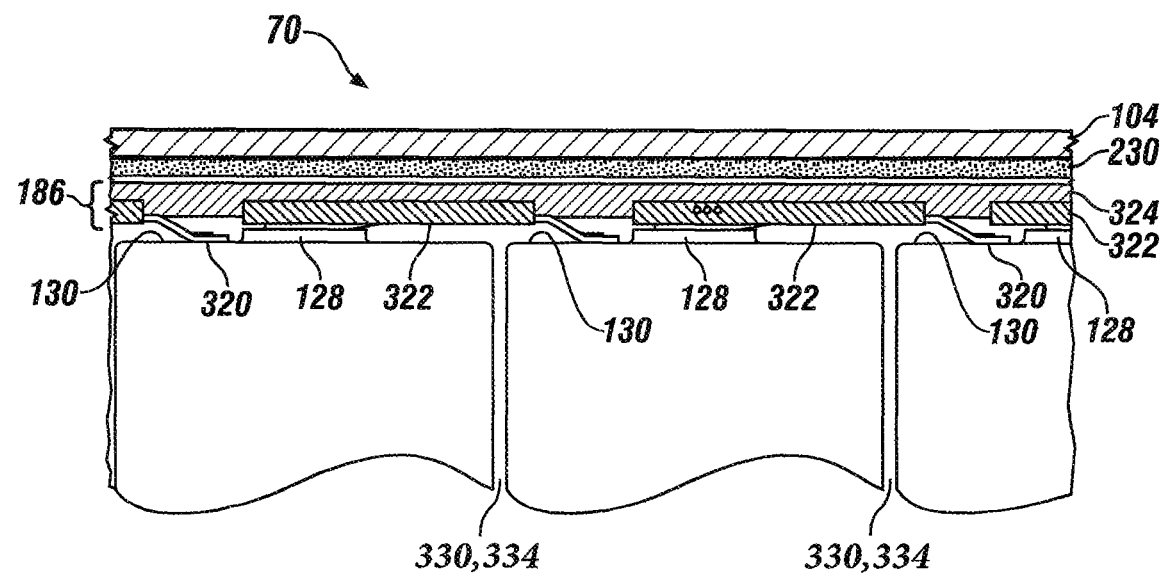
FIG. 9 is a schematic cross-sectional diagram of a portion of the structure around the battery cells in accordance with one or more exemplary embodiments.

Referring to FIG. 9, a schematic cross-sectional diagram of a portion of the structure around the first end 124 of several battery cells 120 is shown in accordance with one or more exemplary embodiments. The figures illustrates the top cover 104, the fourth adhesive layer 230, the top cell carrier 182, the interconnect board 186, and a few battery cells 120. The interconnect board 186 includes the first conductive lines 320 that electrically connect the positive electrical terminals 128 to adjoining negative electrical terminals 130. The interconnect board 186 includes the second conductive lines 326 322 that electrically connect adjacent rows of the battery cells 120. The interconnect board 186 includes the conductive senselines 324 used to sense the node voltages across each battery cell 120. The isolation gaps 334 filled with the potting material 330 between the adjacent battery cells 120 are also illustrated.

Figure 10:
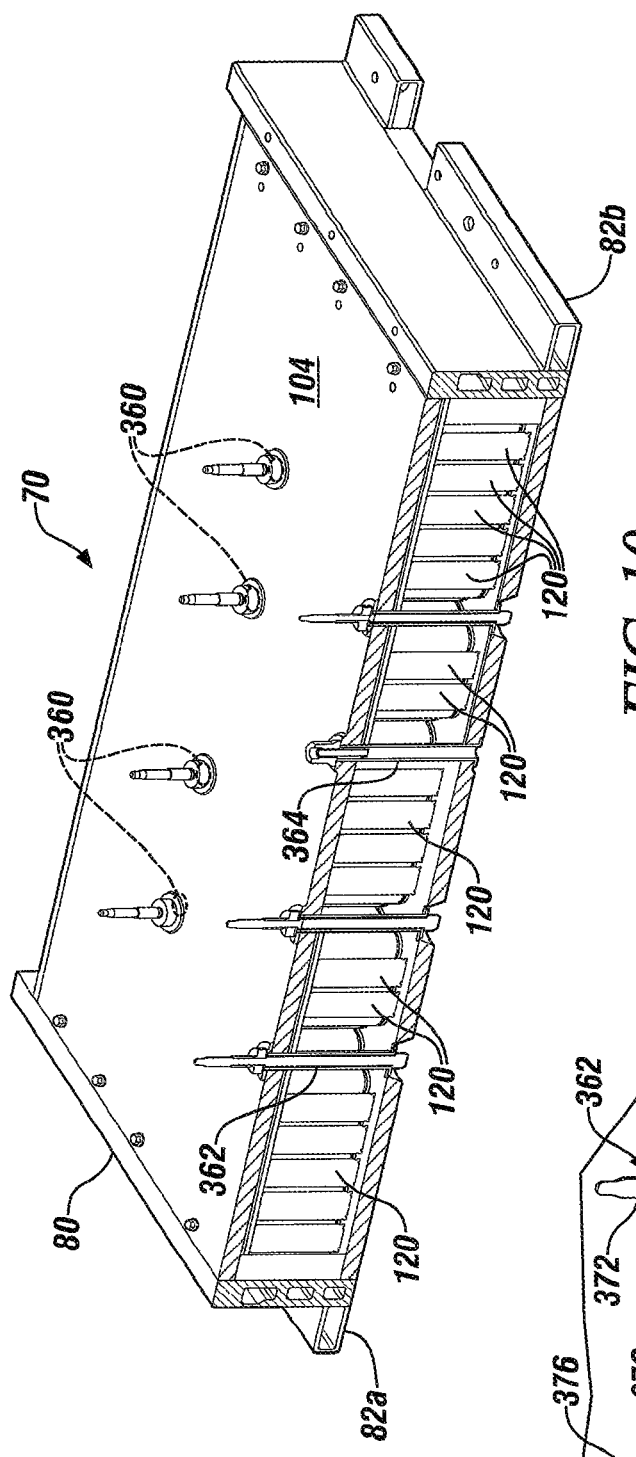
FIG. 10 is another schematic cross-sectional diagram of the structural battery pack in accordance with one or more exemplary embodiments.

Referring to FIG. 10, a schematic cross-sectional diagram of the structural battery pack 70 is shown in accordance with one or more exemplary embodiments. The figure shows the outer frame 80, the top cover 104, the bottom cover 140 and multiple battery cells 120. Mounting brackets 82a-82b may be attached to the outer frame 80. The top cover 104 and the bottom cover 140 may each include multiple bores 360. Extended mounting feature 362 are disposed in several bores 360. Flush mounting features 364 are disposed in several bores 360. The extended mounting features 362 and the flush mounting features 364 are used to align and attach the structural battery pack 70 to an underside of the vehicle 60.

Figure 11:
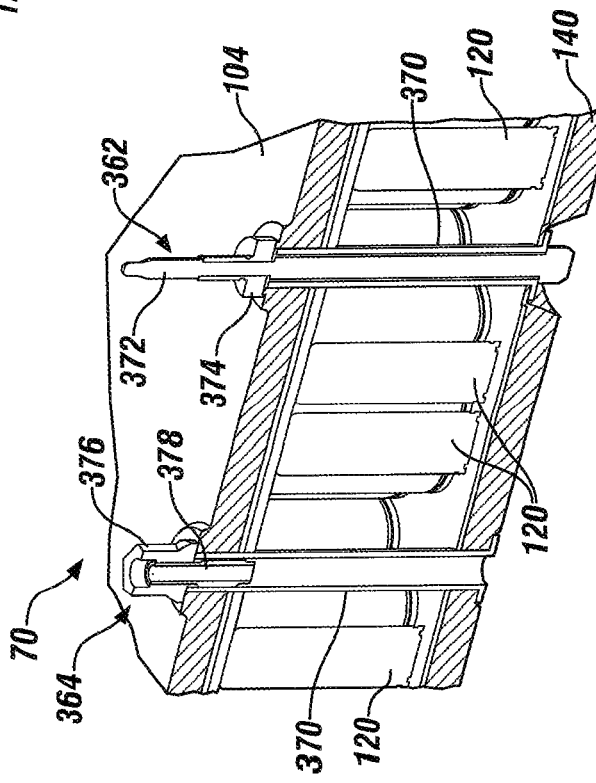
FIG. 11 is a schematic cross-sectional diagram around mounting features in accordance with one or more exemplary embodiments.

Referring to FIG. 11, a schematic cross-sectional diagram around the mounting features 362 and 364 is shown in accordance with one or more exemplary embodiments. The extended mounting features 362 include a tube 370 that extends through the structural battery pack 70, a rod 372 that extends through the tube 370, and a collar 374 attached to the rod 372 and welded to the top cover 104. The flush mounting feature 364 includes the tube 370, a nut 376 attached to the tube 370 and welded to the top cover 104, and a pin 378 disposed in the nut 376 and the tube 370.

Figure 12:
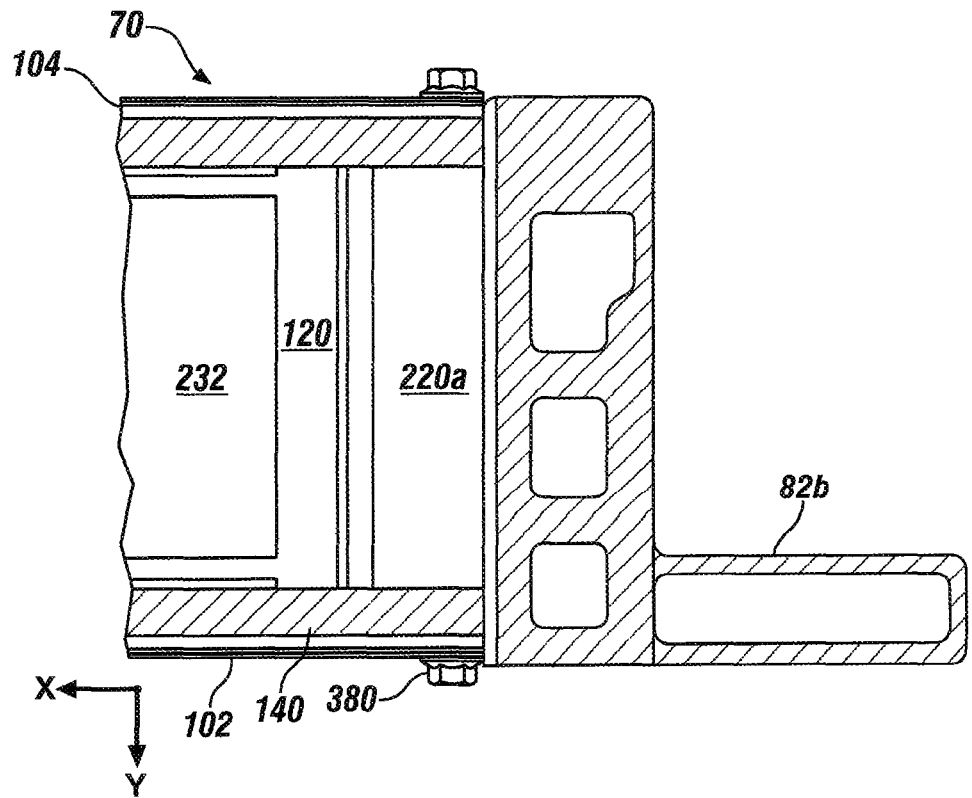
FIG. 12 is a schematic cross-sectional diagram around an end of the structural battery pack in accordance with one or more exemplary embodiments.

Referring to FIG. 12, a schematic cross-sectional diagram around one end of the structural battery pack 70 is shown in accordance with one or more exemplary embodiments. The figure illustrates the top cover 104, the side support 220a, the mounting bracket 82b, the battery cells 120, the cooling ribbons 232, the bottom cover 140, and the skid plate 102. Multiple bolts 380 (one shown) may hold the various layers of the structural battery pack 70 together in the vertical direction Z Embodiments of the structural battery pack 70 generally reduce components within the pack to components that add value to the structure. The resulting pack may be volumetrically efficiency and thus may fit more battery cells 120 in a given space. The pack may be efficient in terms of mass due to the absence of module housings, module mounting hardware, and inter-module harnessing is eliminated. The lower component count may also provide cost benefits.

The skid plate 102 integration into the structural battery pack 70 and connections to the outer frame 80 generally provided for improved structural loading and interfaces with adjacent components. The hexagon pattern 200 may optimize battery cell layout that allows for a bussing within a single interconnect board 186 that provides a reduced and uniform height as shown in FIG. 10. The top cell carrier 182 that includes the interconnect board 186 provides sensing, bussing, and fusing within as shown in FIG. 10.

Fabrication of the structural battery pack 70 utilizes an adhesive strategy to bond the various components together. The bottom cell carrier 142 provides venting paths to allow the hot gasses 172 and particles to flow away from a battery cell 120 in thermal runaway and out of the structural battery pack 70, as shown in FIG. 4. The bottom cell carrier 142 also supports the second end 126 (e.g., bottom) of the battery cells 120 with the rupture disks 170 to protect cells from thermal runaway gases and particulates, as shown in FIG. 4.

Placement of the battery cells 120 may provide space to link the top cover 104 to the bottom cover 140 for center attachments to the underbody of the vehicle 60. The outer frame 80 transfers loads equally to the top cover 104 and the bottom cover 140.

Embodiments of the disclosure generally provide a structural battery pack characterized by the lack of battery modules. The structural battery pack includes a bottom cover, a bottom cell carrier, multiple battery cells, one or more cooling ribbons, a top cell carrier and a top cover. The bottom cover has a rectangular shape that defines a longitudinal direction and a lateral direction. The bottom cell carrier is coupled to the bottom cover, and defines multiple bottom holders. The bottom holders are arranged in a hexagon pattern that defines multiple rows in the longitudinal direction and multiple columns in the lateral direction.

The top cell carrier is coupled to the top cover, defines multiple top holders, and includes an interconnect board. The top holders are arranged in the hexagon pattern, and mirror the bottom holders.

The battery cells are installed in the bottom cell carrier and the top cell carrier. Each battery cell has a cylindrical shape with a casing, a first end, and a second end opposite the first end. The first end has a positive electrical terminal and a negative electrical terminal. The first ends are located within the top holders. The second end has a vent plate. The second ends are located within the bottom holders. The cooling ribbon are installed between the battery cells along the p rows.

The interconnect board includes first conductive lines arranged in the longitudinal direction, and second conductive lines arranged in the lateral direction. The first conductive lines electrically connect in series the battery cells in each row. The second conductive lines electrically connect two or more of the first conductive lines.

The outer frame is coupled to the bottom cover and the top cover, and surrounding the battery cells. The outer frame, the bottom cover, the bottom cell carrier, the top cell carrier, and the top cover direct a physical force applied to the battery pack around the plurality of battery cells that enables the structural battery pack to be implemented without battery modules and/or space-consuming internal supports.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A structural battery pack comprising:
   a bottom cover having a rectangular shape that defines a longitudinal direction and a lateral direction;
   a bottom cell carrier coupled to the bottom cover, and defining a plurality of bottom holders, wherein:
      the plurality of bottom holders is arranged in a hexagon pattern; and
      the hexagon pattern defines a plurality of rows in the longitudinal direction, and a plurality of columns in the lateral direction;
   a plurality of battery cells installed in the bottom cell carrier, wherein:
      each of the plurality of battery cells has a cylindrical shape with a casing, a first end, and a second end opposite the first end;
      the first end has a positive electrical terminal and a negative electrical terminal;
      the second end has a vent plate; and
      the second ends are located within the plurality of bottom holders;
   a plurality of rupture disks disposed neighboring the plurality of battery cells at the second end, wherein each of the plurality of rupture disks is configured to uncover a neighboring vent plate in response to an overpressure event caused by a rupture in a corresponding one of the plurality of battery cells;
   a cooling ribbon installed between the plurality of battery cells along the plurality of rows;
   a top cell carrier coupled to the plurality of battery cells, wherein:
      the top cell carrier defines a plurality of top holders, and includes an interconnect board;
      the plurality of top holders is arranged in the hexagon pattern;
      the first ends of the plurality of battery cells are located within the plurality of top holders;
      the interconnect board includes a busbar assembly having a plurality of first conductive lines arranged in the longitudinal direction, and a plurality of second conductive lines arranged in the lateral direction;
      the plurality of first conductive lines electrically connects in series the plurality of battery cells in each of the plurality of rows; and
      each of the plurality of second conductive lines electrically connects two or more of the plurality of first conductive lines;
   a top cover coupled to the top cell carrier; and
   an outer frame coupled to the bottom cover and the top cover, and surrounding the plurality of battery cells,
   wherein the outer frame, the bottom cover, the bottom cell carrier, the top cell carrier, and the top cover direct a physical force applied to the structural battery pack around the plurality of battery cells.

2. The structural battery pack according to claim 1, wherein:
   the plurality of bottom holders is formed with a body and a plurality of standoffs;
   the body defines the plurality of bottom holders;
   the plurality of standoffs forms an air gap between the body and the bottom cover; and
   the air gap is in fluid communication with the vent plate of each of the plurality of battery cells to receive a gas escaping from one or more of the plurality of battery cells.

3. The structural battery pack according to claim 2, wherein the body is formed with a plurality of shelves offset from the bottom cover.

4. The structural battery pack according to claim 3, wherein:
   the plurality of rupture disks are installed on the plurality of shelves; and
   each of the plurality of rupture disks is configured to dislodge from a corresponding one of the plurality of shelves in response to the overpressure event caused by the rupture in the corresponding one of the plurality of battery cells.

5. The structural battery pack according to claim 1, wherein:
   the plurality of second conductive lines connects adjacent rows of the battery cells in parallel to define a plurality of battery cell sets; and
   each of the plurality of battery cell sets has a plurality of nodes connected in series by the plurality of first conductive lines.

6. The structural battery pack according to claim 5, wherein the interconnect board includes a plurality of conductive senselines electrically connected to the plurality of nodes within the plurality of battery cell sets.

7. The structural battery pack according to claim 1, wherein the plurality of bottom holders and the plurality of top holders locate the casings of the plurality of battery cells apart from each other in the longitudinal direction to establish a plurality of isolation gaps between neighboring ones of the plurality of battery cells, and in the lateral direction to provide space for the cooling ribbon.

8. The structural battery pack according to claim 7, further comprising a potting material inserted into the plurality of isolation gaps.

9. The structural battery pack according to claim 1, wherein the structural battery pack is characterized by a lack of a plurality of battery modules.

* * * * *